Sept. 30, 1930.  G. F. JONES  1,776,911
PACKING AND LUBRICATING RODS AND SHAFTS
Filed Jan. 6, 1928

INVENTOR
G. F. JONES

Patented Sept. 30, 1930

1,776,911

UNITED STATES PATENT OFFICE

GEORGE FREDERICK JONES, OF LONDON, ENGLAND, ASSIGNOR, BY MESNE ASSIGNMENTS, TO BRITISH METALLIC PACKINGS COMPANY (1929) LIMITED, OF LONDON, ENGLAND, A BRITISH COMPANY

PACKING AND LUBRICATING RODS AND SHAFTS

Application filed January 6, 1928, Serial No. 244,941, and in Great Britain February 22, 1927.

This invention relates to lubricating and packing sliding rods such as piston rods and provides means for greatly or wholly obviating the entry of dust and dirt into the stuffing box or equivalent, as well as providing good lubrication with economical use of oil.

According to the invention I provide an annular chamber around the rod on or near the outer end of the stuffing box and in this chamber I place a ring of say L or U section and packed with absorbent material, say felt. An opening, with any suitable closing device, is provided into the chamber for the entry of the lubricant and that part of the ring which is outermost may be provided with a flange or short cylinder which fits closely but easily around the rod. The outer end of this flange, if used, may be comparatively sharp so as to scrape off any dirt as the rod moves inwardly. The said ring is made in two or more segments, say three, and encircled by a spiral spring or equivalent so that with a slight clearance at each cut the ring will be closely held onto the packing and the flange will be a close fit to the rod.

The chamber forms an oil reservoir and the ring may be perforated to facilitate entry of oil to the absorbent material.

The invention is illustrated in the accompanying drawings, in which:—

Figure 1:
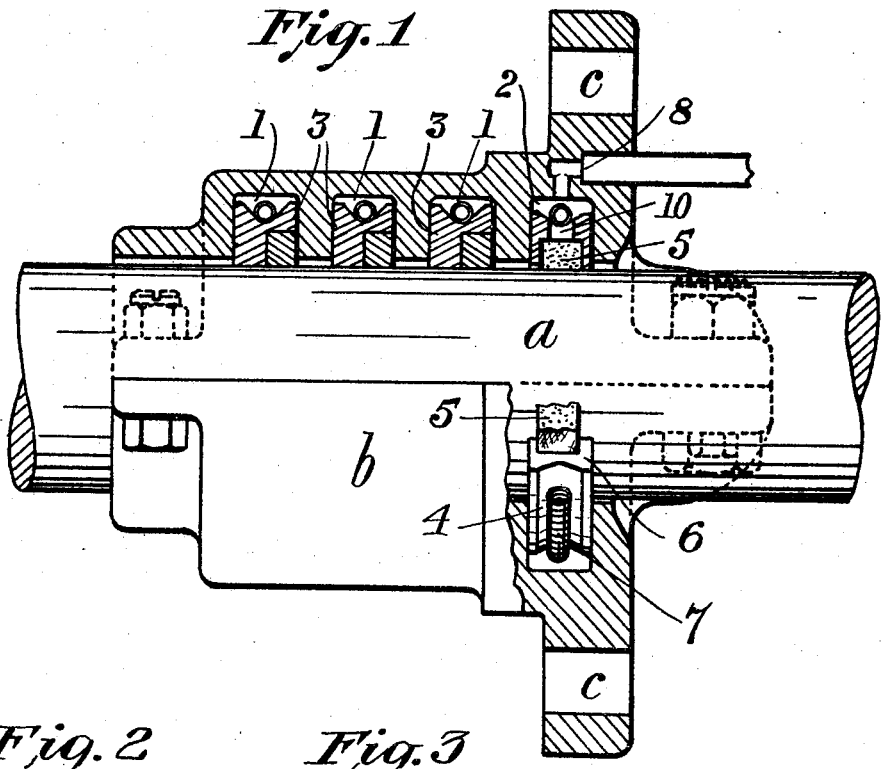
Figure 1 is a view in longitudinal section, partly in elevation, illustrating the invention.
Figures 2, 3:
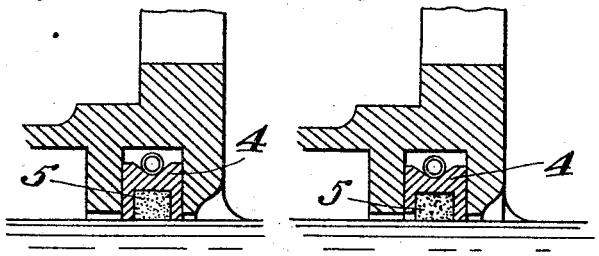
Figures 2 and 3 are sectional details illustrating slightly modified arrangements.

The invention contemplates a construction wherein a piston rod $a$ is surrounded by a two-part cylindrical casing $b$ which contains packing rings. Holes $c$ are provided for the reception of securing bolts.

The casing has three annular chambers 1, 1, 1, and a chamber 2, the chambers 1 containing metallic packing rings 3 and the chamber 2 being for the reception of my improved lubricating device.

This device, in the example shown, comprises a ring 4 of substantially U section within which a packing 5 of felt or other suitable absorbent material is placed. The ring is cut substantially radially as at 6 into three or more segments and its periphery is grooved to receive a spiral spring 7 which encircles the ring. The segments forming the ring do not butt closely against one another and thus the spring maintains the segments and the felt or equivalent in close contact with the piston rod $a$, thereby arresting any dirt which may have been deposited on the rod during its reciprocation and preventing the dirt getting to the metallic rings in the chambers 1.

For the purpose of effecting lubrication of the rod and packing rings an oil inlet is provided at 8 and one or more of the ring segments have holes 10 for the passage of the oil to the inside of the ring 4 and to the felt 5. A film of oil from the felt is deposited on the rod and comes into contact with the metallic rings in the chambers 1. Thus the arrangement described provides for the efficient and economical lubrication of these rings and at the same time prevents the passage to them of foreign matter.

The outer edge only of the ring 4 is shown in contact with the rod but both edges may be in contact therewith and a flange may be provided on the outer edge and may be sharpened.

Instead of the ring being of U section as shown in the drawings, it may obviously be of any other appropriate section.

What I claim is:—

Means for lubricating a reciprocating rod, including a casing encircling the rod and formed with annular chambers, packing rings in certain of the chambers, and a lubricating ring in another of said chambers, said ring being of U-form in cross section with the opening facing the rod and made in sections, a spring encircling all sections to maintain them in ring forming relation and cause them to be held under tension, and an annular packing seated in the U-shaped recesses of all sections and bearing upon the rod.

In testimony whereof I affix my signature.

GEORGE FREDERICK JONES.